May 20, 1952   J. M. NISSEN   2,597,020
CONTROL MECHANISM FOR RUDDER AND PROPELLER FEATHERING CONTROL
Filed Oct. 16, 1945   2 SHEETS—SHEET 2

Inventor
James M. Nissen
By Ralph L. Chappell
Attorney

Patented May 20, 1952

2,597,020

UNITED STATES PATENT OFFICE 2,597,020

CONTROL MECHANISM FOR RUDDER AND PROPELLER FEATHERING CONTROL

James M. Nissen, Los Altos, Calif.

Application October 16, 1945, Serial No. 622,672

8 Claims. (Cl. 244—76)

(Granted under the act of March 3, 1883, as amended April 30, 1928; 370 O. G. 757)

The present invention relates to new and useful improvements in vehicle control systems, and more particularly to improvements in flight control mechanism for aircraft having more than one engine.

In operation of a multi-engine airplane, asymmetric flight conditions result from the failure, stoppage or slowing down of an engine or engines on one side of the center axis of the airplane. Such conditions are caused by differential or unbalanced thrust influences exerted by the propellers driven by the engines and result in a tendency for the airplane to turn toward the side of the lesser or zero engine thrust under the influence of the greater thrust of the engine or engines on the other side of the airplane. This asymmetric power condition may be corrected by applying compensating rudder forces but in certain types of aircraft, the necessary forces to be applied are excessive and tiring on the pilot when continued flight is to be maintained.

With the foregoing in mind, one of the principal objects of the present invention is to effect automatic correction of turning tendencies of a multi-engine airplane under asymmetric power conditions.

Another object of the present invention is to automatically apply corrective rudder or tab forces to compensate for unbalanced thrust conditions in asymmetric power flight.

A further object of the invention is to also effect automatic shifting of the propeller blades of the inoperative engine or engines from a windmilling to a feathered position in order to improve flight conditions.

A still further object of the invention is to effect the aforesaid control of flight by means responsive to airflow pressure differentials resulting from asymmetric power conditions.

The invention still further aims to provide a control mechanism of the above type which is relatively simple in construction and thoroughly effective in operation.

The above and other objects of the invention will in part be obvious and will be hereinafter more fully pointed out.

Figure 1:
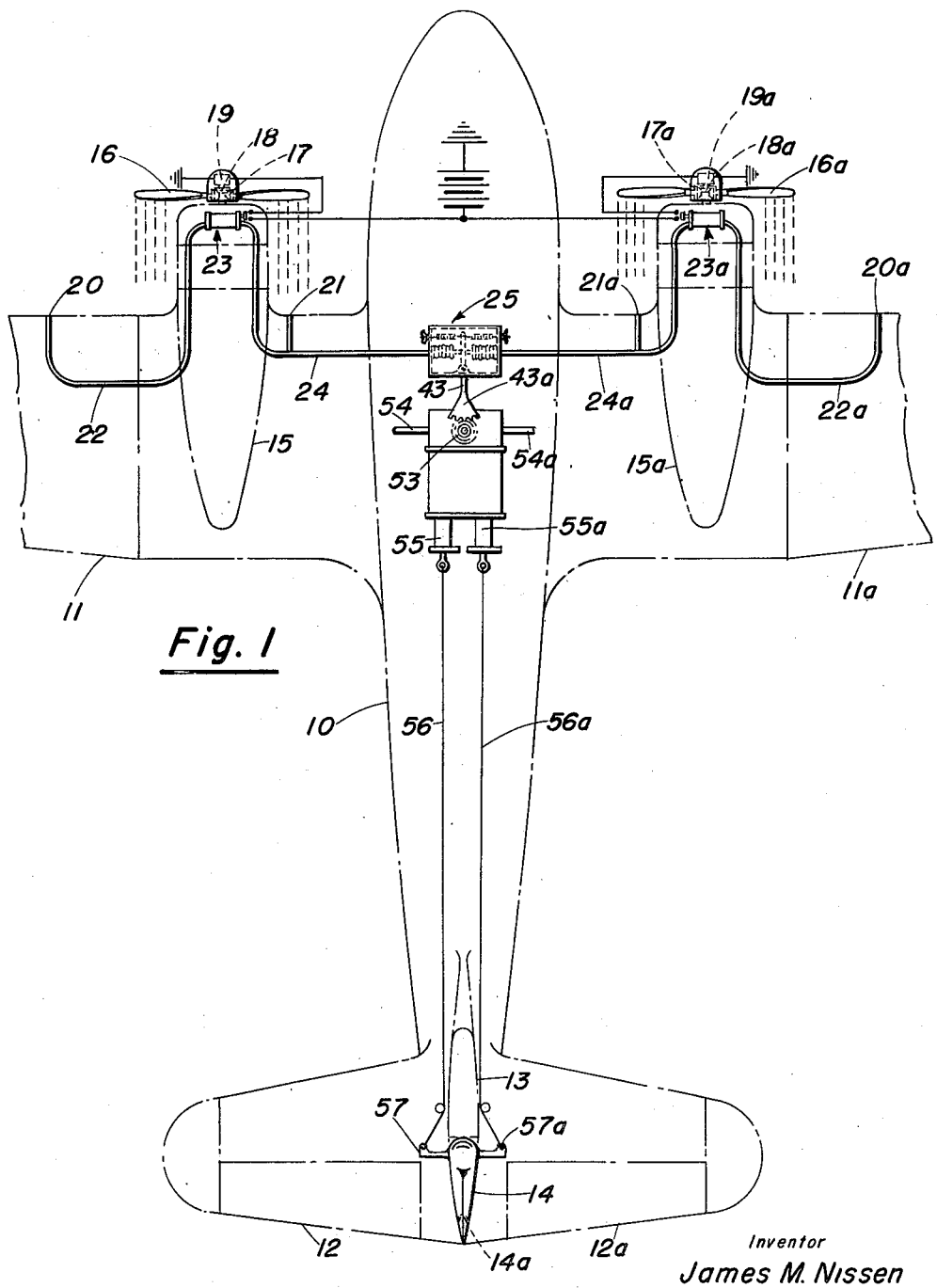
Fig. 1 is a diagrammatic fragmentary plan view showing the lay out of the control mechanism.

Referring more in detail to the accompanying drawings, and particularly at this time to Fig. 1 thereof, the invention is illustrated in connection with a more or less conventional type of twin engine airplane having a fuselage 10, wings 11, 11a, elevator control surfaces 12, 12a and a fin 13 and rudder 14 assembly of conventional form and including a rudder tab 14a. The airplane is illustrated as including twin left and right engines 15, 15a having conventional propellers 16, 16a, respectively, although the invention may be applied to any multi-engine airplane. The propellers are of the type which may be feathered and to this end they carry bevel gears 17, 17a, respectively, which are in mesh with driving bevels 18, 18a, respectively. The driving bevels may be driven by an electric motor 19, 19a or other suitable power mechanism, the operation of which is well known in the art but will be hereinafter briefly referred to.

Continuing reference to the diagrammatic showing of Fig. 1, there are provided impact heads, 20, 20a at the leading edges of the wings 11, 11a, respectively, and these heads are located outside of the path or area of the forced airstream immediately behind the propellers. Located in the propeller slipstream are additional impact heads 21, 21a behind the propellers 16, 16a, respectively, so that the forced airstream caused by the propellers is picked up by these heads. The heads 20, 20a are connected by conduits 22, 22a respectively to the outboard ends of the feathering control units 23, 23a, respectively, which will be hereinafter described. The heads 21, 21a, are joined to further conduits 24, 24a, respectively. The conduit 24 communicates with the inboard end of the control unit 23 associated with the left engine 15 and is connected to a control unit 25 which will be described below and which controls or initiates actuation of the rudder or tab. Similarly, the conduit 24a is connected to the control unit 25 and to the inboard end of the control unit 23a associated with the right engine 15a.

Figure 3:
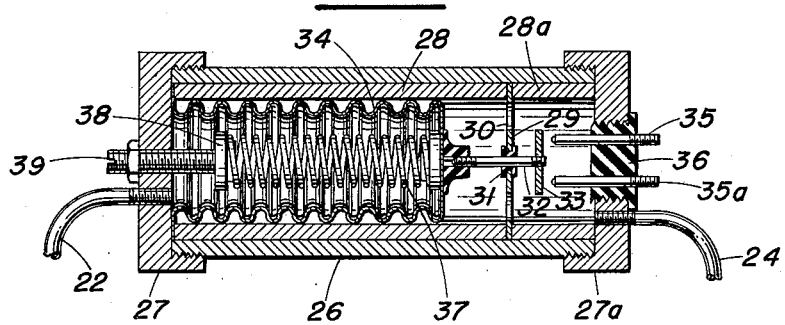
Fig. 3 is an enlarged longitudinal section of the left pressure responsive means for initiating feathering of the propeller blades.

Both feathering control units are identical so that the description of the unit 23, references being had to Fig. 3 of the accompanying drawings, will suffice. This unit includes a cylindrical casing 26 having externally threaded ends to receive by threaded engagement therewith end closure members 27, 27a. The casing has a liner of two cylindrical sections 28, 28a between which is fixed a transversely disposed plate 29 having fluid apertures 30 therethrough, and a centrally located grommet 31 of insulating material. The grommet 31 serves as a guiding bushing for a reciprocable stem 32 carrying a contact plate 33 at its free end and having the opposite end thereof secured in suitable manner to the inner closed end of a bellows type piston 34 adapted to be moved longitudinally of the casing. The opposite end of the bellows is flared outwardly and clamped between the closure 27 and the adjacent end of the liner 28. Under certain conditions of operation, as will be hereinafter pointed out, the plate 33 will contact and close the circuit between the electric leads 35, 35a which extend through an insulating plug 36 in the closure 27a. The leads are connected by electric circuit means, as shown diagrammatically in Fig. 1, to the feathering motor 19. A coil spring 37 is disposed within the bellows and bears longitudinally against the closed end thereof. The opposite end of the spring abuts and is centered on a plate 38 carried at the inner end of an adjusting screw 39 passing through the closure 27.

Figure 2:
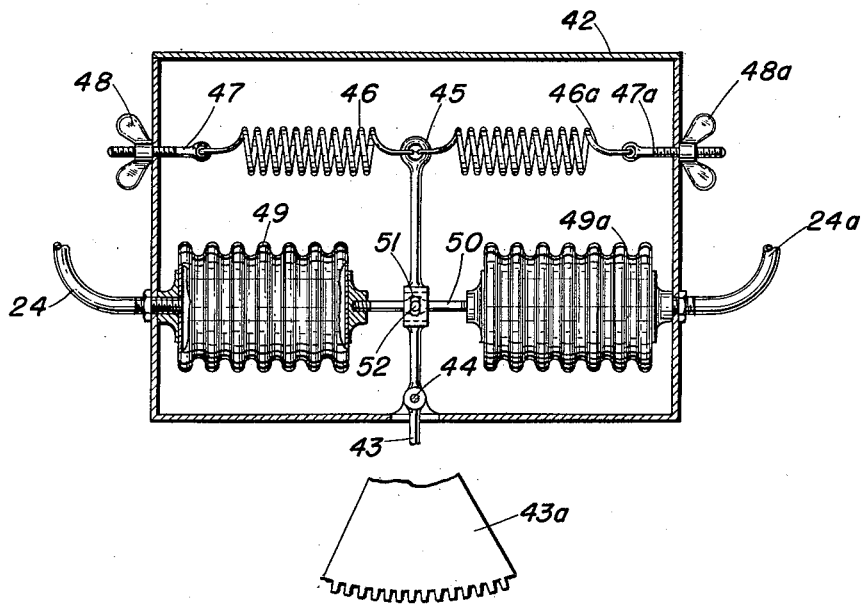
Fig. 2 is an enlarged longitudinal section of the pressure responsive means for controlling operation of the rudder or tab surface.

The rudder or tab control unit 25 is illustrated in one form, as shown in Fig. 2, and includes a housing 42. A lever 43 extends into the housing and is pivotally mounted thereon, as at 44. The inner end of the lever is provided with a loop portion 45 to which the inner ends of opposed coil springs 46, 46a are connected. The outer ends of the coil springs are connected to anchor rods 47, 47a, which, in turn, are secured and may be adjusted by wing nuts 48, 48a, respectively. A pair of bellows 49, 49a, are also mounted within the housing in axial alignment with one another and are connected at their inner closed ends by a rod 50. In order to permit movement of the lever in response to movements of the bellows, the rod 50 is provided with a pin 51 extending through a slot 52 extending longitudinally of the lever which carries at its outer free end a segmental rack 43a. The bellows 49, 49a are in communication at their outer fixed ends with the conduits 24, 24a, respectively.

Assuming the airplane to be in balanced flight with both engines exerting the same thrust, it will be seen that the heads 20, 20a pick up dynamic pressure at the leading edges of the wings and that the heads 21, 21a pick up the increased pressure induced by the propellers 16, 16a, respectively. Under such flight conditions, the greater pressures picked up at the heads 21, 21a are directed by conduits 24, 24a to the inboard ends of the casings of the control units 23, 23a, respectively, and thus, acting against the impact pressures set up within the bellows from the impact heads 20, 20a serve to move the bellows toward collapsed position in order to maintain the contact leads open so that the feathering motors 19, 19a remain inoperative. Similarly, the equalized combined pressures in conduits 24, 24a are directed to the bellows 49, 49a in the control unit 25 so that these bellows are balanced against each other through the rod 50 and the lever 43 remains in a central position offering no influence on the rudder or tab control mechanism.

Assume now that the left motor 15 fails during flight. When this condition exists, the pressure in conduit 24 which is connected to the head 21, drops, and with it the pressure within the bellows 49, so that the bellows 49 of the control unit 25 will be urged toward a collapsed position under the relatively stronger influence of the bellows 49a. Thus, through the connecting rod 50, the lever 43 will be shifted in a counter-clockwise direction, as viewed in Figs. 1 and 2, and this will act through the rack 43a to shift a control valve 53 of any suitable type (not shown in detail) which is adapted to control the supply of fluid under pressure from the fluid pressure lines 54, 54a to the cylinders for the hydraulic pistons 55, 55a. This selective control is of conventional form and is such as to apply the required amount of corrective rudder forces through the cables 56, 56a which are connected to the horns 57, 57a, respectively, of the rudder 14. Similarly, the control may be through conventional mechanism to the rudder tab 14a, if desired. Under the assumed conditions, right rudder will be applied by retraction of the piston 55a and corresponding extension of the piston 55 in order to maintain straight flight of the airplane without the necessity of the pilot exercising such control. As soon as the engine power has been cut off, the pressure picked up at the head 21 will drop below the dynamic pressure picked up at the head 20 so that during the application of right rudder forces the pressure within the inboard end of the casing of the control unit 23 will drop. Under this condition, the pressure within the bellows 34, being impact pressure at the head 20, will cause the bellows to expand until ultimately the plate 33 will close the contact between the electric leads 35, 35a and thus close the circuit to the feathering motor 19 which will then act through the gears 17, 18 to rotate the blades of the propeller 16 from a windmilling to a feathered position so as to further decrease resistance offered to straight flight of the airplane. After the propeller blades have been feathered, the pressure in the conduits 22, 24 will become approximately equal and the slight rise in the pressure created after feathering in the conduit 24 will tend to slightly expand the bellows 49 so as to reduce the original amount of the setting of right rudder. Thus, as the blades of the inoperative engine are feathered and the resistance to forward motion of the plane reduced, a slightly lesser rudder angle is required to maintain straight flight and this correction is automatically accomplished by the mechanism described.

From the foregoing description, it will be seen that the present invention provides a highly effective mechanism operable in response to pressure variations under various conditions for holding a straight course when an engine stops without necessitating the application of rudder force by the pilot. The arrangement will also automatically apply required changes in rudder force as the power on the operative engine or engines is varied in accordance with pressure variations in the tube heads behind the propellers. The required change in rudder force is also applied as the result of airspeed variations during asymmetric power flight conditions. Similarly, during the landing approach, the arrangement will supply the required rudder force with change in power of the operative engine or engines and when the engine or engines are cut out during landing. Also, if an engine fails shortly after take off, the propeller will be automatically feathered and the pilot will experience little or no rudder force change.

The device may be pre-set to give zero rudder force for any desired flight conditions and may be connected to the throttle controls so that it will operate only when the throttles are forward of a predetermined position and so that the propeller will feather at a predetermined percent of normal rated power. A conventional on and off main switch may be incorporated for ready access to the pilot.

While one form of the invention has been shown for purposes of illustration, it is to be clearly understood that various changes in the details of construction, arrangement of parts and mode of operation may be accomplished without departing from the scope of the invention as set forth in the appended claims.

The invention described herein may be manufactured and used by or for the Government of the United States of America for governmental purposes without the payment of any royalties thereon or therefor.

I claim:

1. In an aircraft having a plurality of laterally disposed engines with propellers driven thereby and a steering control surface, a plurality of impact heads located in the slipstreams of said propellers, respectively, means communicating with said heads and responsive to pressure differentials created by unbalanced thrust forces exerted by the propellers for shifting said control surface to compensate for the unbalancing, and pressure responsive means communicating with said heads and operable upon failure of an engine for feathering the propeller blades of the inoperative engine to reduce the pressure differential on the first-mentioned responsive means.

2. In an aircraft having a plurality of laterally disposed engines with propellers driven thereby and a control surface, an impact head positioned in the slipstream of each of said propellers, means communicating with the heads and responsive to pressure differentials therebetween for shifting said control surface to compensate for any unbalance, and individual means communicating with each of the heads and responsive to a predetermined change in pressure differential between the slipstream pressure and the dynamic pressure adjacent the associated propeller for feathering the propeller to thereby reduce the pressure differential on the first-mentioned responsive means.

3. In an aircraft having a plurality of laterally disposed engines with controllable pitch propellers driven thereby and a control surface, an impact head positioned in the slipstream of each of said propellers, means communicating with the heads and responsive to pressure differentials therebetween for shifting said control surface to compensate for any unbalance, and motive means operatively connected with said propellers and responsive to a predetermined change in pressure differential between the slipstream pressure and the dynamic pressure adjacent each propeller for feathering the associated propeller thereby to reduce the pressure differential on the first-mentioned means.

4. In an aircraft having a plurality of laterally disposed engines with controllable pitch propellers driven thereby and a control surface, pressure responsive means positioned in the slipstream of each of said propellers, means communicating with the first-named means and responsive to pressure differentials therebetween for shifting said control surface to compensate for any unbalance, and motive means connected with said propellers and responsive to a predetermined change in pressure differential between the slipstream pressure and the dynamic pressure adjacent each propeller for feathering the associated propeller thereby to reduce the pressure differential on the second-named means.

5. In an aircraft having a plurality of laterally disposed engines with controllable pitch propellers driven thereby and a control surface, means responsive to pressure differentials created by unbalanced thrust forces exerted by the propellers for shifting said control surface to compensate for the unbalancing, and motive means connected to said propellers and responsive to a predetermined change in pressure differential between the slipstream pressure of each propeller and the dynamic pressure adjacent thereto for feathering the associated propeller thereby to reduce the pressure differential on the first-named means.

6. In an aircraft having a plurality of laterally disposed engines with propellers driven thereby and a control surface, first pressure responsive means positioned in the slipstream of each of said propellers, second pressure responsive means positioned adjacent each of said propellers for receiving the dynamic pressure of the airstream flowing past said aircraft, means communicating with said first means and responsive to pressure differentials therebetween for shifting said control surface, and means communicating with the first and second means and operatively connected with its associated propeller and responsive to a predetermined change in pressure differential between said first and second means for feathering the associated propeller.

7. In an aircraft having a plurality of laterally disposed engines with propellers driven thereby and a steering control surface, a plurality of impact heads, one located in the slipstream of each propeller so as to pick up the pressure thereof, means in communication with said heads and responsive to pressure differentials created as the result of unbalanced thrust forces exerted by the propellers for shifting said control surface to positions counteracting the turning tendencies resulting from such unbalanced thrust conditions, pressure responsive means responsive to a reduction in the pressure induced by one of the engines due to failure of said one engine for feathering the propeller blades of said one engine to reduce said pressure differentials and correspondingly reduce said shifting of said control surface, the last-mentioned responsive means comprising a feathering control motor operatively connected with each propeller and controlled by individual pressure responsive devices responsive to the difference between the slipstream pressure and the dynamic pressure.

8. In an aircraft having a first and a second engine together with a propeller driven by each engine, a device for each propeller to change the pitch of each propeller, and a control surface, individual means for each propeller to actuate said devices for controlling the pitch of each propeller, said means each including an impact head exposed to dynamic pressure, a control unit and a conduit extending from said head to said unit, means for actuating said control surface in response to an unbalanced condition caused by dissimilar slipstream pressures caused by said propellers, the last-mentioned means including a control unit with means operatively connecting the last-mentioned unit to said surface, conduits extending from each of the first-mentioned units to the last mentioned unit, and impact heads exposed to the propellers slipstream pressure and connected to the last-mentioned conduits so that the slipstream pressure motivates the last-mentioned unit and also influences the extent of actuation of the first-mentioned units.

JAMES M. NISSEN.

REFERENCES CITED

The following references are of record in the file of this patent:

UNITED STATES PATENTS

| Number | Name | Date |
|---|---|---|
| 1,908,894 | Findley | May 16, 1933 |
| 1,972,336 | Gardner | Sept. 4, 1934 |
| 2,039,720 | Lambert | May 5, 1936 |
| 2,128,983 | Blanchard | Sept. 6, 1938 |
| 2,167,533 | Solomon | July 25, 1939 |
| 2,195,036 | Palmer | Mar. 26, 1940 |
| 2,244,139 | Buckingham | June 3, 1941 |
| 2,257,126 | Rindfleisch | Sept. 30, 1941 |
| 2,280,713 | Martin et al. | Apr. 21, 1942 |
| 2,320,195 | Rindfleisch | May 25, 1943 |
| 2,322,303 | Martin | June 22, 1943 |
| 2,323,151 | Meredith | June 29, 1943 |
| 2,364,871 | Reissner | Dec. 12, 1944 |
| 2,365,214 | Reissner | Dec. 19, 1944 |
| 2,402,065 | Martin | June 11, 1946 |
| 2,449,104 | Burcham | Sept. 14, 1948 |
| 2,492,252 | Wing | Dec. 27, 1949 |

FOREIGN PATENTS

| Number | Country | Date |
|---|---|---|
| 558,744 | France | May 31, 1923 |
| 765,366 | France | Mar. 19, 1934 |